US010019719B2

(12) United States Patent
Roe et al.

(10) Patent No.: US 10,019,719 B2
(45) Date of Patent: Jul. 10, 2018

(54) SYSTEMS FOR AUTHORIZATION OF REWARD CARD TRANSACTIONS

(75) Inventors: Timothy John Roe, London (GB); Alisa J. Copeman, Surrey (GB); Wendy MacDonald, Sussex (GB); James H. Marsden, East Sussex (GB)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 927 days.

(21) Appl. No.: 12/812,019

(22) PCT Filed: Nov. 17, 2009

(86) PCT No.: PCT/US2009/064806
§ 371 (c)(1),
(2), (4) Date: Jul. 7, 2010

(87) PCT Pub. No.: WO2011/062579
PCT Pub. Date: May 26, 2011

(65) Prior Publication Data
US 2012/0221397 A1    Aug. 30, 2012

(51) Int. Cl.
*G06Q 40/00* (2012.01)
*G06Q 30/02* (2012.01)
*G06Q 20/40* (2012.01)

(52) U.S. Cl.
CPC .............. *G06Q 30/02* (2013.01); *G06Q 20/40* (2013.01)

(58) Field of Classification Search
CPC ........ G06C 40/00; G06C 40/02; G06C 20/10; G06C 20/102; G06C 20/40; G06C 30/02; G06C 30/04; G06C 30/06

USPC ................................................ 705/39–42, 17
See application file for complete search history.

(56) References Cited

U.S. PATENT DOCUMENTS

| | | | | |
|---|---|---|---|---|
| 6,065,675 A | * | 5/2000 | Teicher | 235/380 |
| 2001/0054003 A1 | * | 12/2001 | Chien et al. | 705/14 |
| 2005/0080692 A1 | * | 4/2005 | Padam et al. | 705/30 |
| 2005/0080716 A1 | * | 4/2005 | Belyi | G06Q 40/08 705/38 |

(Continued)

OTHER PUBLICATIONS

Pathways Announces Smart Card Toolkit: 'E-Bank,' Card Handler and Multiple Purse/Multiple Application Functions Featured, PR Newswire, Sep. 2, 1997,3 pages.*

(Continued)

*Primary Examiner* — Hani M Kazimi
(74) *Attorney, Agent, or Firm* — Snell & Wilmer L.L.P.

(57) ABSTRACT

A system for authorizing a reward card transaction includes an account server configured to receive an authorization request for a transaction performed using the reward card. The system also is configured to compare the amount of the transaction to an available balance in a bank account linked to the reward card and authorize the transaction based on the comparison. The system further is configured to transmit an authorization for the transaction. A system updating a credit limit on a reward card includes an updating module configured to receive amounts of authorized reward card transactions and amounts of authorized bank account transactions. The system also is configured to update a credit limit on a reward card based on the reward card transaction amounts and/or the bank account transaction amounts.

15 Claims, 8 Drawing Sheets

(56) References Cited

U.S. PATENT DOCUMENTS

| | | | |
|---|---|---|---|
| 2006/0161478 A1* | 7/2006 | Turner | G06Q 30/02 705/14.17 |
| 2006/0266821 A1* | 11/2006 | Zajkowski et al. | 235/380 |
| 2007/0022048 A1* | 1/2007 | Kingsborough et al. | 705/39 |
| 2007/0271179 A1* | 11/2007 | Kubota | 705/39 |
| 2008/0040261 A1* | 2/2008 | Nix et al. | 705/39 |
| 2009/0106112 A1* | 4/2009 | Dalmia et al. | 705/14 |
| 2010/0057553 A1* | 3/2010 | Ameiss et al. | 705/14.32 |
| 2010/0205091 A1* | 8/2010 | Graziano | G06Q 20/102 705/40 |
| 2011/0011931 A1* | 1/2011 | Farley et al. | 235/382.5 |
| 2012/0035998 A1* | 2/2012 | Chien et al. | 705/14.17 |

OTHER PUBLICATIONS

Press Release, "Starbucks Launches New Automatic Reload Option for Starbucks Card," Seattle, WA, Sep. 17, 2002.*

Visa International Launches Major Smart Card Program in Leading Shopping and Entertainment District in Tokyo PR Newswire Jul. 15, 1998, 4 pages.*

Lamb, Seimens vs. Racom: Two Approaches to Dual-Interface Smart Cards, The Race Between EEPROM and FRAM is on, Report on Smart Cards, Jun. 3, 1996, http://www.racom.com/rsc exd.htm, 7 pages.*

International Search Report dated Mar. 4, 2010 in Application No. PCT/US2009/64806.

Written Opinion dated Mar. 4, 2010 in Application No. PCT/US2009/64806.

International Preliminary Report on Patentability dated May 31, 2012 in Application No. PCT/US2009/64806.

Examination Report dated Apr. 24, 2013 in Australian Application No. 2009355614.

Office Action dated Aug. 1, 2014 in Canadian Application No. 2,781,183.

Examiner's Report dated Sep. 4, 2015 in Canadian Application No. 2,781,183.

Examination Report dated Feb. 25, 2016 in United Kingdom Application No. GB1209092.4.

Final Office Action dated May 16, 2017 in Canadian Application No. 2,781,183.

* cited by examiner

| Time | Particulars | Available Bank Account Balance | Available Balance | Reward Points |
|---|---|---|---|---|
| Day 29 | | | | |
| 8:00h | Available line of credit in bank account | $ 1,000 | $ 1,000 | 260 |
| 9:00h | Customer withdraws $100 using his Debit card | $ 900 | $ 900 | 260 |
| 10:40h | Customer buys a gift from Reward Card for $150 | $ 900 | $ 750 | 275 |
| 12:30h | Customer buys a coffee and pastry for $5 using his Debit Card | $ 895 | $ 745 | 275 |
| 16:30h | Customer buys lunch for $100 from Reward Card | $ 895 | $ 645 | 285 |
| Day 30 | | | | |
| 1:00h | $250 Reward Card transactions cleared | $ 645 | $ 645 | 285 |

| Status Update Associated With Bank Account | | Actual Bank Account Balance | Status Update Associated With Reward Card | | Reward Card Spend | Available Balance |
|---|---|---|---|---|---|---|
| Particulars | Amount | | Particulars | Amount | | |
| Initial balance | | $10,000 | | | | $10,000 |
| | | | Merchandise | $500 | $500 | $9,500 |
| | | | Food Items | $100 | $600 | $9,400 |
| | | | Airline tickets | $1,200 | $1,800 | $8,200 |
| Cash withdrawal | $2,000 | $8,000 | | | | $6,200 |
| Gasoline | $500 | $7,500 | | | | $5,700 |
| Online funds transfer | $300 | $7,200 | | | | $5,400 |
| Debit from bank account to reward card | $1,800 | $5,400 | Credit to reward card | ($1,800) | $0 | $5,400 |
| Updated Credit Limit (= Bank Account Balance − Total Reward Card Spend) | | | | | | $5,400 |

SYSTEMS FOR AUTHORIZATION OF REWARD CARD TRANSACTIONS

CROSS-REFERENCE TO RELATED APPLICATIONS

This application is U.S. national phase filing under 35 U.S.C. § 371 of PCT/US2009/064806, entitled "SYSTEMS FOR AUTHORIZATION OF REWARD CARD TRANSACTIONS" filed on Nov. 17, 2009.

BACKGROUND OF THE INVENTION

Field of the Invention

The invention relates generally to reward cards, and, more specifically, to a system for authorization of reward card transactions.

Description of Related Art

Transaction cards are now used extensively for making payments around the world. Consumers may use such transaction cards to make payments, for example, at retail outlets through a point-of-sale (POS) infrastructure, or over the Internet through online interfaces to payment gateways. Types of transaction cards include, but are not limited to, credit cards, debit cards, and charge cards.

Some transaction cards, such as credit cards or charge cards, offer rewards to consumers for making payments using the transaction card. The rewards may include, for example, reward points, airline miles, money or cash back, gift vouchers, merchandise vouchers, health vouchers, and the like. Such types of transaction cards are referred to herein as reward cards. Usually, reward card service providers offer the consumer a credit limit. The consumer may make transactions up to the credit limit of the reward card, and subsequently pay back the reward card service provider within a pre-defined billing cycle, e.g., one month. If the consumer does not fully pay back the reward card service provider within the billing cycle then the consumer typically incurs a finance charge.

Consumers sometimes spend more through a reward card than they are able to pay back within the billing cycle, and thereby incur additional financial charges. Thus, some consumers may be or become credit averse, preferring not to spend through a reward card in order to avoid being in debt.

Such customers often prefer to use other transaction cards, such as debit cards, for making payments. Typically, these cards are directly associated with a current balance in a bank account of the customer. Transactions made through these cards are immediately debited from the bank account of the customer, and thus they can offer greater financial safety and stability to the customer; use of these cards reduces the need for the consumer to consciously exercise spending discipline. However, in such cases, the customer may lose various benefits, such as, but not limited to, reward points that might have been earned by spending with a credit card or a charge card. Accordingly, there is a need for a solution that combines the financial safety and stability of other transaction cards with the incentives of a reward card.

SUMMARY OF THE INVENTION

The present invention can meet the above-mentioned need by providing methods, systems and computer program products for authorizing transactions associated with a reward card.

According to one embodiment of the present invention, there is disclosed a system for authorizing a reward card transaction. The system includes an account server configured to receive an authorization request for a transaction performed using a reward card. The account server also is configured to compare the amount of the transaction to an available balance in a bank account linked to the reward card. The account server is further configured to authorize the transaction based on the comparison and transmit an authorization.

According to another embodiment of the present invention, there is disclosed a system for updating a credit limit associated with a reward card. The system includes an updating module configured to receive an amount of at least one authorized reward card transaction and receive an amount of at least one authorized bank account transaction. The updating module also is configured to update a credit limit on a reward card based on at least one of the amount of the at least one authorized reward card transaction and the amount of the at least one authorized bank account transaction.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings, in which like reference numbers indicate identical or functionally similar elements. Additionally, the left-most digit of a reference number identifies the drawing in which the reference number first appears.

DETAILED DESCRIPTION OF THE INVENTION

I. Overview

The present invention is directed towards a system and computer program product for authorizing payments for reward cards and updating a credit limit associated with the reward card.

The term "reward card," as used herein, refers to payment transaction cards, such as a credit card, a charge card, and the like, which may entitle its holder to buy goods and services based on the holder's promise to pay for these goods and services within a pre-defined period of time. Generally, transactions made by reward cards are posted in a periodic basis and the holder/customer must pay back the amount after a pre-defined period of time. A reward card may be associated with one or more benefits, such as, but not limited to, reward points, gift vouchers, and redemption coupons, that may be earned by performing transactions at a point of sale on a merchant location or shopping online through the Internet. However, the term "reward card" is not limited to payment transaction cards associated with such benefits.

The terms "transaction" and "purchases," as used herein, may be used interchangeably and refer to any financial transaction initiated by a customer. Broadly speaking, a financial transaction may mean an event between a buyer and a seller, where the buyer acquires an asset from the seller in exchange for payment, or an event where a customer withdraws cash from an automated teller machine (ATM) or from a bank account.

The term "bank account," as used herein, refers to a deposit account held by a customer at a financial institution. Examples of such deposit accounts include savings accounts, checking accounts, money market accounts, and other demand accounts. In general, the term "bank account" does not extend to a credit account. However, a line of credit may be associated with a bank account. For example, a customer's checking account may be provided with overdraft coverage, which is a line of credit to the customer equaling the amount of any transactions that would exceed the balance of the checking account.

The present invention allows a customer of the reward card to select an authorization mode to approve the transactions made through the reward card and/or to decide a period of time upon which the credit limit associated with the reward card is periodically updated. The credit limit associated with the reward card shall primarily mean a maximum amount of credit that a financial institution or other lender will extend to the customer on the reward card for making financial transactions.

Additional aspects of the present invention include a reward server and an account server that are linked with each other through a communication network. The reward server may communicate with the account server in order to authorize a transaction performed by the reward card or for updating the credit limit associated with the reward card. The account server may be operable to calculate in real-time an available balance in a bank account of the customer. In various embodiments of the invention, the calculation of an available balance may be based on transactions made by the customer on the bank account, e.g., a debit card transaction, as well as transactions made by the reward card which are posted but yet not debited. The account server may communicate the available balance to the reward server which may in turn authorize the transactions made by the reward card and/or update the credit limit associated with the reward card. In some of these embodiments, the account server can be operated by the bank or other entity at which the customer's bank account is held, and the reward server can be operated by the bank or other entity which issued the reward card.

The detailed description of exemplary embodiments of the present invention herein makes reference to the accompanying drawings and figures, which show the exemplary embodiments by way of illustration only. While these exemplary embodiments are described in sufficient detail to enable those skilled in the art to practice the present invention, it should be understood that other embodiments may be realized and that logical and mechanical changes may be made without departing from the spirit and scope of the present invention. It will be apparent to a person skilled in the pertinent art that this invention can also be employed in a variety of other applications. Thus, the detailed description herein is presented for purposes of illustration only and not of limitation. For example, the steps recited in any of the method or process descriptions may be executed in any order and are not limited to the order presented.

The present invention is described herein with reference to system architecture, block diagrams and flowchart illustrations of methods, and computer program products according to various aspects of the present invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

II. System

The present invention will now be described in terms of an exemplary system in which the present invention, in an embodiment, would be implemented. This is for convenience only and is not intended to limit the application of the present invention. It will be apparent to one skilled in the relevant art(s) how to implement the present invention in alternative embodiments.

Figure 1:
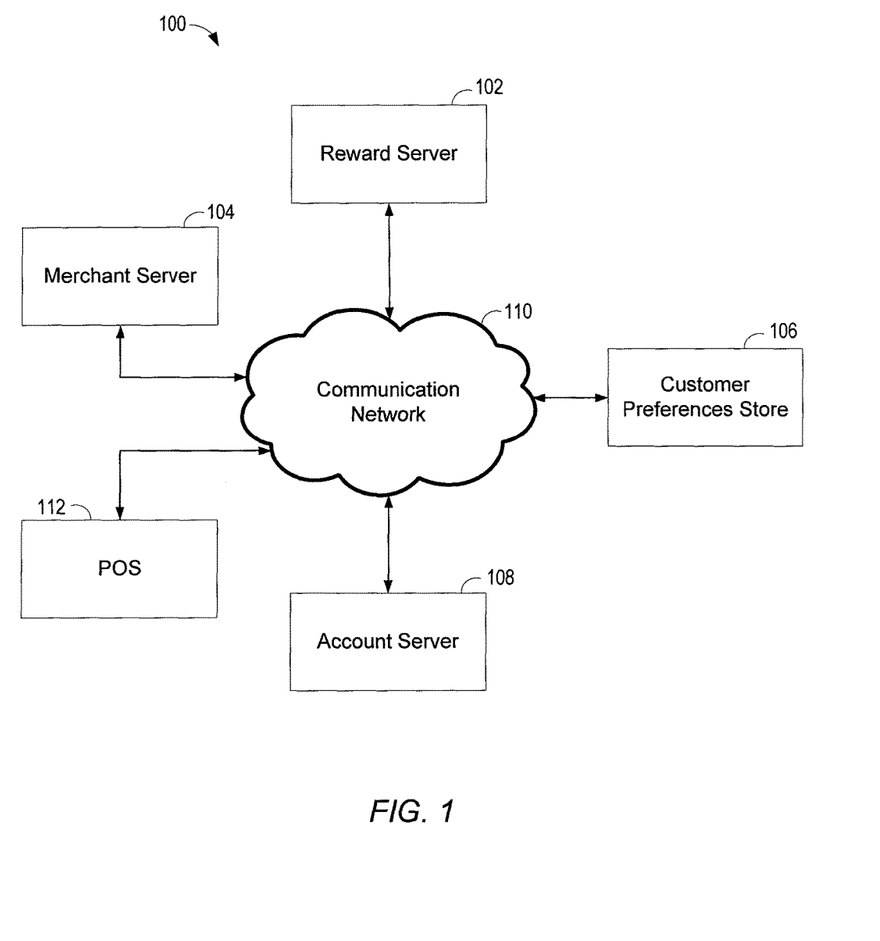
FIG. 1 is an exemplary environment in which the present invention may be deployed, according to an embodiment of the present invention.

FIG. 1 shows an exemplary environment 100, in which various embodiments of the present invention may be deployed. As shown in the FIG. 1, the exemplary environment 100 includes a reward server 102. In embodiments of the present invention, the reward server 102 may receive transaction authorization requests through one or more payment gateways. The term "payment gateways" refers to an application service provider that authorizes payments for businesses, online shopping, cash withdrawal, and other POS transactions by a reward card.

In environment 100, reward server 102 is connected to merchant server 104, customer preferences store 106, and account server 108 through communication network 110. Examples of communication network 110 may include, but are not limited to, a wide area network (WAN), a local area network (LAN), an Ethernet, the Internet, an intranet, a cellular network, a satellite network, and any other suitable network for transmitting data. In various embodiments, communication network 110 may include a combination of two or more of the aforementioned networks and/or other types of networks known in the art. Communication network 110 may be implemented as a wired network, a wireless network or a combination thereof. Further, data may be transmitted between the customer, reward server 102, and the external devices in an encrypted or otherwise secure format.

Reward server 102 also is connected to point-of-sale (POS) 112. A customer can initiate a transaction through point-of-sale (POS) 112, which may located at, for example, a merchant location. A POS can be a terminal or, more generally, hardware and/or software for reading financial transaction cards used for payment of purchased goods and/or services. In this example, a transaction is initiated by swiping the reward card of the customer at the POS 112. When a transaction is initiated at POS 112, reward server 102 receives a request for authorization of the payment via merchant server 104. Reward server 102 may be connected to one or more payment gateways (not shown in FIG. 1) to receive the authorization request for the transaction. One aspect of the present invention is that a reward card of the customer may be linked to a bank account. By linking the reward card to the bank account, a credit limit of the reward card, i.e., a maximum transaction amount that may be authorized on the reward card, may depend upon an available balance in the bank account. Accordingly, in processing the authorization request, reward server 102 uses communication network 110 to communicate with account server 108 to check if an available balance in the bank account is sufficient to authorize the transaction. Upon receiving a confirmation that there is sufficient available balance in the bank account, reward server 102 may authorize the transaction performed by the reward card. This authorization is explained in detail in conjunction with FIGS. 2 and 4. In one embodiment of the invention, authorization is based on the available balance in the bank account. In other embodiments of the invention, however, authorization is further based on a line of credit amount, i.e., a credit limit, of the reward card. The credit limit may calculated on a periodic basis based on the available balance in the bank account as well as the spending history of the customer as reflected through bank account and reward card transactions.

FIG. 1 also shows that customer preferences store 106 is in communication with reward server 102 and account server 108 via communication network 110. Customer preferences store 106 may include customer preferences such as, but not limited to, an initial credit limit that may be associated with the reward card, a pre-defined time period upon which account server 108 may calculate the available balance in the bank account, a pre-defined time period upon which the credit limit associated with the reward card may be updated, a pre-defined time period upon which the transactions made through the reward card are posted into the bank account, and a pre-defined time period upon which the posted reward card transactions should be debited from the bank account. In various embodiments of the present invention, the customer may use various existing interaction channels, such as the Internet, to access customer preferences store 106.

Figure 2:
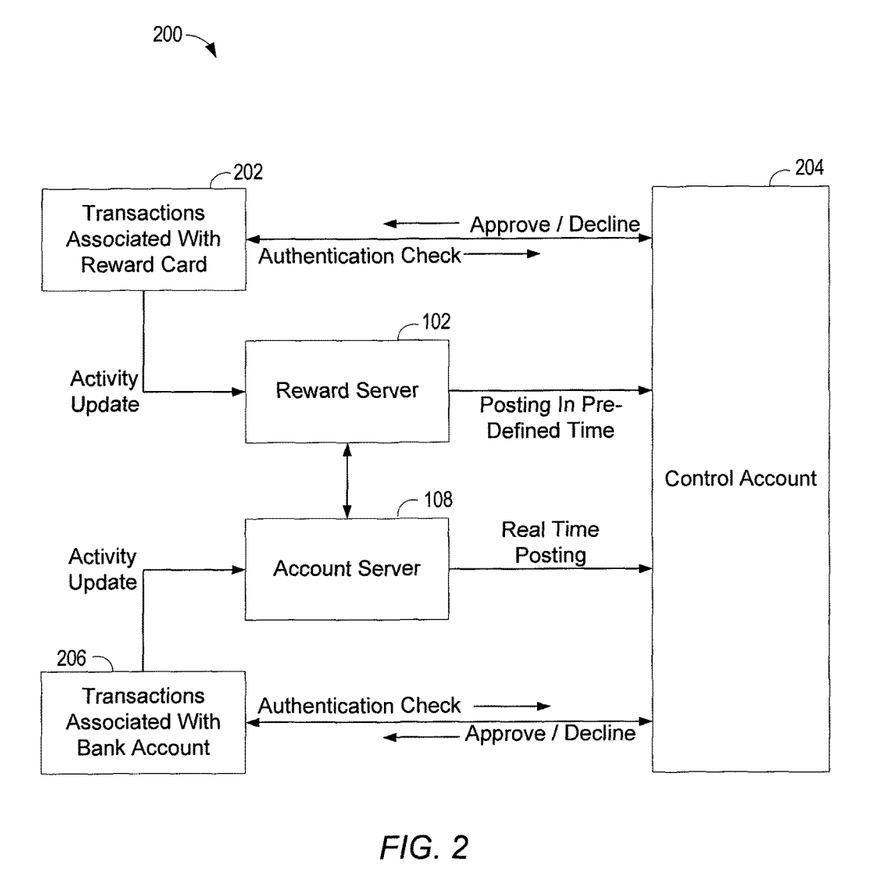
FIG. 2 is a schematic illustration of an exemplary block diagram of a system for authorizing a transaction made by a reward card, according to an embodiment of the present invention.

FIG. 2 illustrates a block diagram of system 200 for authorizing transaction 202 made by a reward card, according to an embodiment of the present invention. As discussed above, a reward card may be linked with a bank account of the customer. In the example embodiment illustrated by FIG. 2, only one reward card is associated with the bank account. However, those skilled in the art will recognize that any number of reward cards can be associated with the bank account and that the example embodiment shown in the FIG. 2 does not limit the scope of the invention. The bank account may be, for example, any checking account or savings account of the customer. The bank account also may be associated with a line of credit. The line of credit can define an amount available in the bank account for one or more transactions, and it may be based on a current balance in the account as well as any other line of credit contributor such as, but not limited to, overdrafts, savings contributions, reward points, redemption coupons and the like.

In various embodiments of the invention, any transaction made by a customer through a reward card may be authorized against an available balance in a bank account of the customer. Thus, when transaction 202 is initiated by the reward card of the customer, reward server 102 may receive an authorization request for transaction 202. In an embodiment of the invention, reward server 102 is operable to determine if the reward card is linked to the bank account of the customer. Further, reward server 102 may obtain, from account server 108, an available balance in the bank account associated with the reward card.

Account server 108 may maintain a control account 204 to keep track of the available balance in the bank account of the customer. Control account 204 is updated with the available line of credit associated with the bank account. The available balance may be calculated based, at least in part, on transactions made through the bank account and transactions made through the reward card of the customer. In various embodiments of the present invention, since the available balance is calculated based, at least in part, on the transactions made by the reward card, the available balance is either the same or less than an actual balance available in the bank account of the customer. In the example embodiment illustrated by FIG. 2, the actual balance present in the bank account of the customer is the available line of credit in the bank account.

As shown in FIG. 2, transactions 206, which are associated with the bank account, are forwarded to account server 108 for authorization and, upon approval, are debited in real time from the line of credit available in the bank account of the customer. Examples of such transactions include, but are not limited to, transactions made through a debit card associated with the bank account, cash withdrawal from an ATM, cash withdrawal from the bank account, and internet banking transactions. Account server 108 may be configured to check with control account 204 for authorization of transactions 206, and further configured to update the control account 204 in real-time about these transactions and the available line of credit associated with the bank account upon deduction of the amount of transactions 206.

Because the reward card is linked to the bank account in various embodiments, reward server 102 may be in communication with control account 204, which is maintained by account server 108. Reward server 102 may update control account 204 periodically about transactions 212, which are made by the reward card. Reward server 102 may post these transactions on control account 204 in pre-defined periodic intervals. In an embodiment of the invention, the periodic intervals are pre-defined by the customer and are stored in the customer preferences store 106.

As discussed above, control account 204 may calculate the available balance in the bank account of the customer based on transactions posted by reward server 102 on control account 204. In embodiments of the invention, control account 204 may calculate the available balance by deducting the amount of posted reward card transactions from the line of credit available in the bank account of the customer. The customer may pre-define a period of time upon which control account 204 may calculate the available balance in the bank account. Such a calculation of the available balance is discussed in conjunction with FIG. 3.

In an embodiment of the invention, upon obtaining the available balance from account server 108, reward server 102 may authorize the transaction if the available balance and the transaction amount meet a pre-defined criterion. For example, reward server 102 may authorize the transaction only if the available balance in the bank account is at least greater than or equal to the amount of the transaction made by the reward card. As another example, reward server 102 may authorize the transaction if a sufficient available balance will be left in the bank account even after authorizing the transaction. As yet another example, reward server 102 may authorize the transaction if the amount of the transaction does not exceed a pre-defined limit above the available balance in the bank account.

In various embodiments of the invention, the posted transactions amount of the reward card is debited from the available line of credit in the bank account. In an exemplary embodiment, the transaction amounts are debited after a pre-defined period of time. For example, if the reward card is a charge card, then the transactions can be debited at the end of a month cycle. Similarly, if the reward card is a credit card, the transactions can be debited at the end of the billing cycle, e.g., a period of 30 to 45 days. In these embodiments, a certain interest rate may be levied if the available line of credit in the bank account is not sufficient to debit the transaction amount or if the customer is not willing to pay the entire transaction amount within the pre-defined time period. The interest rate may be agreed to by the customer, for example, in an initial agreement. Those skilled in the art will appreciate that terms pertaining to the interest rate and the pre-defined period of time or billing cycle may vary for different financial organizations. Once the posted transactions amount is debited, account server 108 may update the control account 204 with the new available line of credit in the bank account.

System 200 may provide a means to show the available balance in the bank account to the customer on demand. The available balance may be provided through, for example, ATMs, online banking, mobile banking, customer service, and the like. In addition to the available balance, the customer may be provided with a statement that provides information related to a current cleared balance, an available line of credit, an amount posted from the reward card but yet to be debited, and the like. The statement may also provide information related to one or more benefits earned, for example, through rewards points on transactions made through the reward card at a POS or by online shopping. Because system 200 can provide a link between a reward card and bank account transactions, the reward card, as well as any other debit card linked to the bank account, may have the same personal identification number (PIN) to access the various means available to access the available balance or perform one or more financial transactions.

By virtue of system 200, the customer may be encouraged to use the reward card extensively in place of debit cards, as the customer may utilize the benefits that may be earned through the transactions performed by the reward card, for example, at a POS or by online shopping. As discussed above, these benefits may include, but are not limited to, reward points, airline miles, food vouchers, health check-up vouchers, merchandise vouchers and the like. Moreover, system 200 can be implemented using existing infrastructure; it does not require significant changes in a POS at a merchant location.

Figure 3:
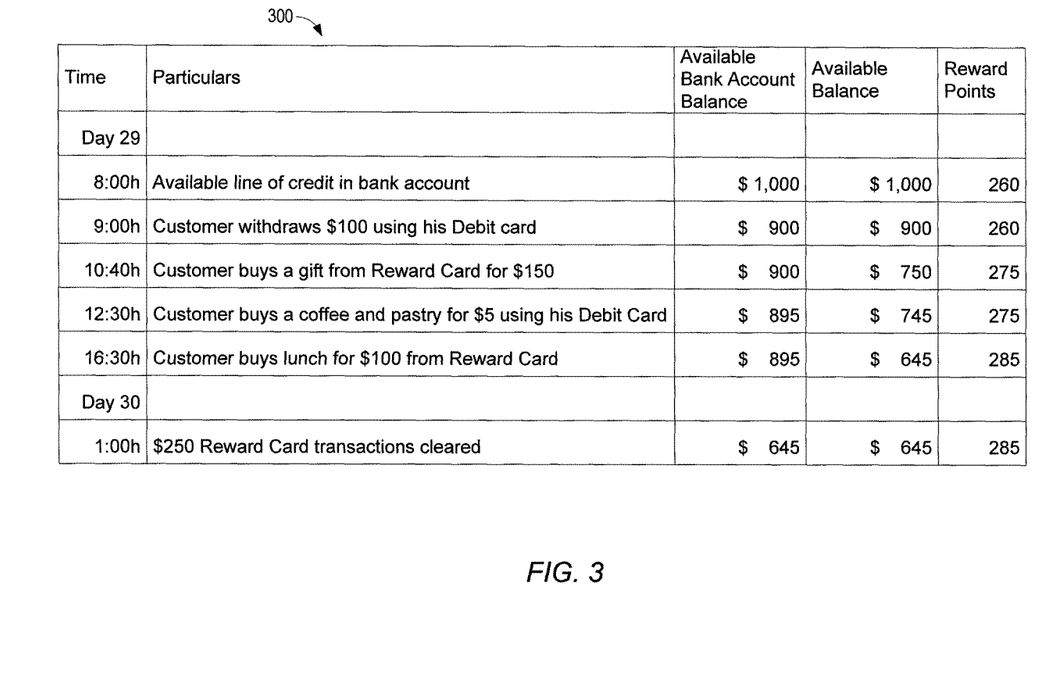
FIG. 3 illustrates an exemplary table for showing an available balance, according to an embodiment of the present invention.

FIG. 3 illustrates a table 300 for calculating and showing an available balance for a particular day. As shown in FIG. 3, table 300 shows the transactions details and the corresponding available bank account amount and available balance. FIG. 3 is provided simply to illustrate an example operation of various embodiments of the invention.

As shown in FIG. 3, the table begins with the available bank account amount and the available balance of the customer at 8:00 as $1000 and reward points balance of 260. When the customer withdraws $100 using his debit card at 9:00, an account server may update this information to a control account in real time. Because this transaction is associated with the bank account of the customer, the amount of the transaction is immediately debited from both the available bank account amount and the available balance. At 10:40, the customer buys a gift in the amount of $150 using his reward card. Upon initiation of this transaction, a reward server may receive an authorization request for the transaction. The reward server may further initiate a request for the account server to calculate the available balance in the bank account. Subsequently, the account server may check the control account to see if the available balance is sufficient to authorize the transaction. Since the available balance at this time is $900, which is greater than the current transaction amount, the account server may communicate to the reward server to authorize the transaction. On receiving the confirmation from the account server, the reward server authorizes the transaction and posts the transaction amount to the bank account within a pre-defined period of time. Subsequently, the control account is updated about the posted transaction and may calculate the available bank account amount and the available balance. The available bank account amount is now $900. However, the available balance is reduced to $750, which is calculated by deducting the posted transaction amount from the available line of credit. Furthermore, the accumulated reward points for the customer increases to 275 points from an initial amount of 260 points. This is because the reward points are earned as a part of the benefit due to spending through the reward card—in this example, one reward point is awarded for each $10 spent at a POS through the reward card—but no such benefits are provided on transactions made by the debit card. Thus, as shown in this transaction, the customer may have option of using either the debit or reward card, yet choose to use the reward card for the benefits associated with its use.

Returning to the description of FIG. 3, when the customer buys $5 of coffee and pastry using the debit card, the control account reflects the available bank account amount as $895 and available balance as $745. Because the debit card is used, no reward points are earned. Another transaction then is done using the reward card. This transaction for $100 causes the control account, upon posting of the transaction, to reflect the available bank account amount as $895 the available balance as $645, and the reward points as 285.

FIG. 3 illustrates another aspect of the invention. In various embodiments, the posted transactions amount of the reward card is deducted from the bank account at the end of the billing cycle. As shown in table 300 on day 30 (which may be the end of the billing cycle of the reward card), the posted reward card transaction amounts of $250, i.e., the two transactions of $150 and $100 on day 29, are deducted from the available bank account balance of $895. Thus, at the end of the billing cycle, the available line of credit for the reward card is same as the available balance in the bank account, i.e., $645.

Figure 4:
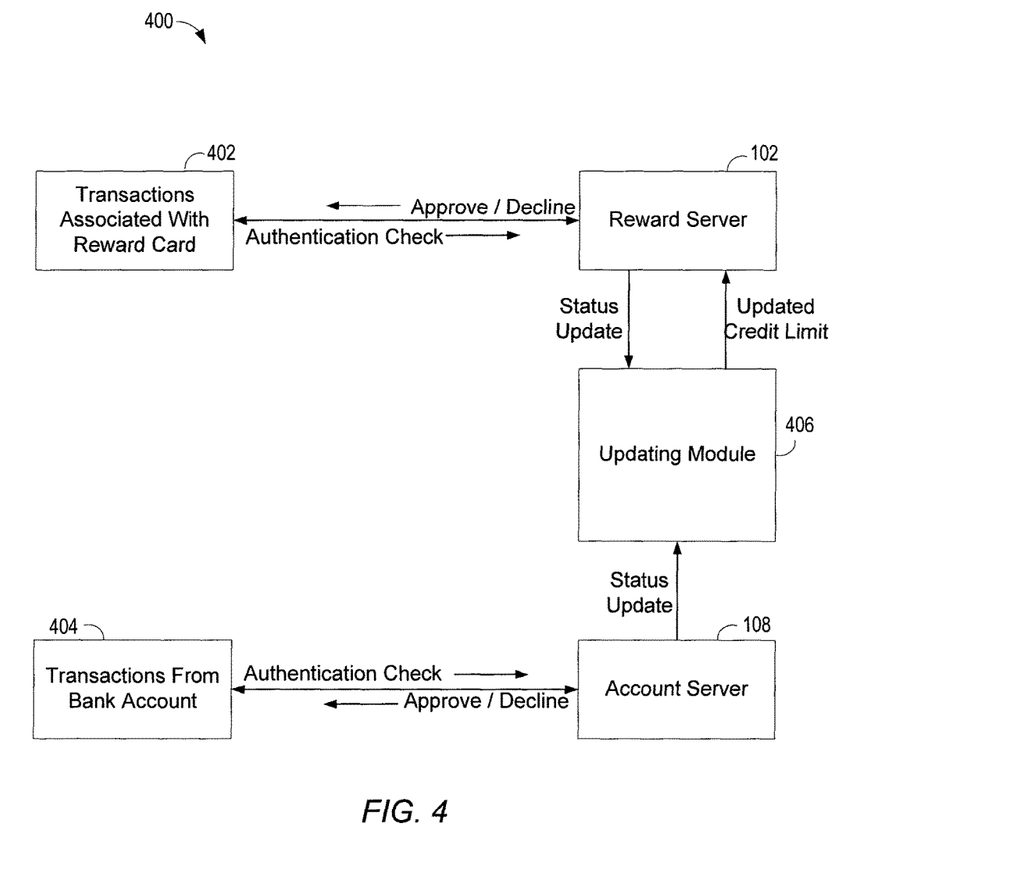
FIG. 4 is a schematic illustration of an exemplary block diagram of a system for updating a credit limit associated with a reward card.

FIG. 4 illustrates a block diagram of a system 400 for updating a credit limit associated with a reward card. In this system, reward server 102 and account server 108 are communicatively linked to updating module 406. Updating module 406 may be maintained by reward server 102, account server 108, or entities associated with these servers. Updating module 406 also may be maintained by a third party.

As shown in FIG. 4, reward server 102 receives an authorization request for any transactions 402 made on a reward card. Reward server 102 may check the credit limit on the reward card and, based on this check, either authorize or decline the transaction. In an embodiment of the present invention, if the credit limit of the reward card reflects that there is sufficient credit associated with the reward card, then reward server 102 may authorize the transaction. The credit limit may be updated periodically based on transactions made on the reward card, or it may be updated based on the transactions associated with a bank account of the customer.

In various embodiments of the invention, any transactions 404 associated with the bank account of the customer may be authorized against an available line of credit in the bank account of the customer. The line of credit may define an amount available in the bank account for one or more transactions associated with the bank account of the customer. The line of credit may be based upon a current balance in the account, or any other line of credit contributor such as, but not limited to, overdrafts, savings contributions, reward points, redemption coupons and the like.

Reward server 102 may periodically send a status update about the various transactions 402 made by the reward card to the updating module 406. In an embodiment of the present invention, the status update associated with the reward card may include a spending history and an available credit limit associated with the reward card. The spending history may include amounts of transactions such as, but not limited to, shopping done through the reward card and cash withdrawals from the available credit limit. The periodic basis for sending the status update may be pre-defined by the customer and stored in a customer preferences store. Account server 108 also may send a status update about various transactions 404 made on the bank account on the same periodic basis or, alternatively, on another periodic basis pre-defined by the customer. The status update associated with the bank account may include a spending history associated with the bank account and an available line of credit in the bank account. The spending history may include amounts of transactions such as, but not limited to, shopping done through the debit card and cash withdrawals from ATMs.

Updating module 406 may receive these status updates for a pre-defined period of time. For example, updating module 406 may receive the status update every month from both account server 108 and reward server 102. In an embodiment of the present invention, the updating module 406 may update the available credit limit based on the status update received from both servers. The updating module 406 may update the credit limit by deducting the amount of the transactions associated with the reward card that are not yet debited from the available line of credit in the bank account. For example, updating module 406 may receive two status updates. One is a status update from the account server that reflects transactions associated with the bank account totaling $2400 and an available line of credit of $8400. The other is a status update from the reward server that reflects that transactions associated with the reward card totaling $3400 and an available credit limit of $10000. In this example, the updating module 406 may update the credit limit to be $4000. In other embodiments, the customer may be allowed to set the initial credit limit on the reward card and then, based on the received status updates, updating module 406 may update the credit limit with an amount, which may be less than, equal to or greater than the available line of credit available in the bank account. Those skilled in the art will recognize that the above examples given for the period of updates and the range of the updated credit limit are merely for illustrative purposes.

In various embodiments of the present invention, system 400 may provide a means to show the updated credit limit and the available line of credit in the bank account to the customer on demand. Both the available line of credit and the updated credit limit may be shown in a single statement to the customer. The statement may be provided through, for example, ATMs, online banking, mobile banking, and/or customer service. The statement may provide information related to one or more benefits earned in the form of rewards points or the like. The reward card and any card linked to the bank account may have the same personal identification number (PIN) for accessing the means.

Figure 5:
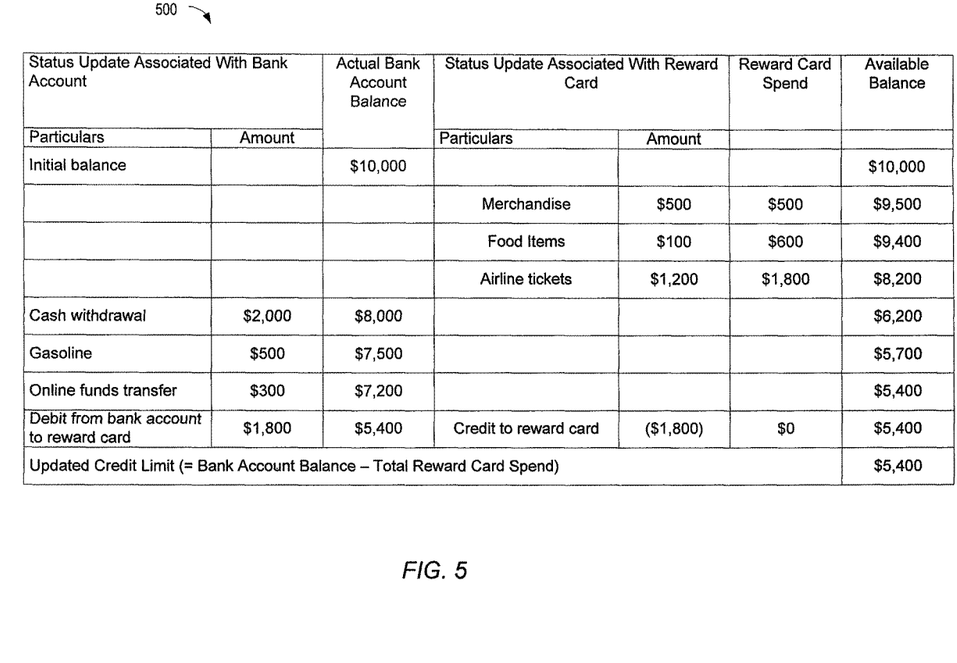
FIG. 5 illustrates an exemplary table for showing status updates associated with a bank account and a reward card, according to an embodiment of the present invention.

FIG. 5 illustrates a table for showing status updates associated with the bank account and the reward card and for updating the credit limit of a reward card according to an embodiment of the present invention. Specifically, table 500 shows the status update associated with the reward card and the status update associated with the bank account.

The initial credit limit associated with the reward card is $10000, i.e., the initial balance of the bank account has been used to determine the initial credit limit. Although not shown in table 500, the initial credit limit of the reward card may be different from the actual initial balance of the bank account because of, for example, an overdraft amount or savings amount that may contribute to the credit limit.

The status update associated with the reward card includes spending made using the reward card: merchandise purchases of $500, food item purchases of $100, and an airline ticket purchase of $1200. Each of these purchases reduces the available balance. However, the credit limit of the reward card may reflect the purchases until the credit limited is updated, which may occur only when a status update is made, even though the available balance is updated. The reduction of the available balance due to the amount of the reward card transactions is $8200.

Similarly, the status update associated with the bank account includes these bank account transactions: cash withdrawals of $2000, gas purchases of $500, and online money transfers of $300. Because these transactions post immediately to the bank account, each causes the actual balance of the bank account, which was initially $10000 to reduce. After these transactions are made, the actual bank account balance is $7200 and the available balance, which reflects reward card spending that has not yet posted to the bank account, is $5,400. However, another bank account transaction is the posting of the reward card transactions to the bank account. This posting, which occurs on a pre-defined interval, causes the total reward card spending of $1,800 to be debited from the bank account. In table 500, the status updates are made after all of the transactions shown.

Upon receiving a status update from an account server and a reward server, an updating module may update the available credit limit associated with a reward card. In an example embodiment of the present invention, considering the data shown in the table 500, the updating module may update the available credit limit to be $5400. This amount is calculated by deducting the amount of the transactions of the reward card that are yet not debited from the available line of credit in the bank account. In various embodiments of the present invention, the updating module may update the credit limit to be less than, equal to, or greater than the available line of credit based on the amounts of the transactions from the reward card that are yet not debited.

III Process

Figure 6:
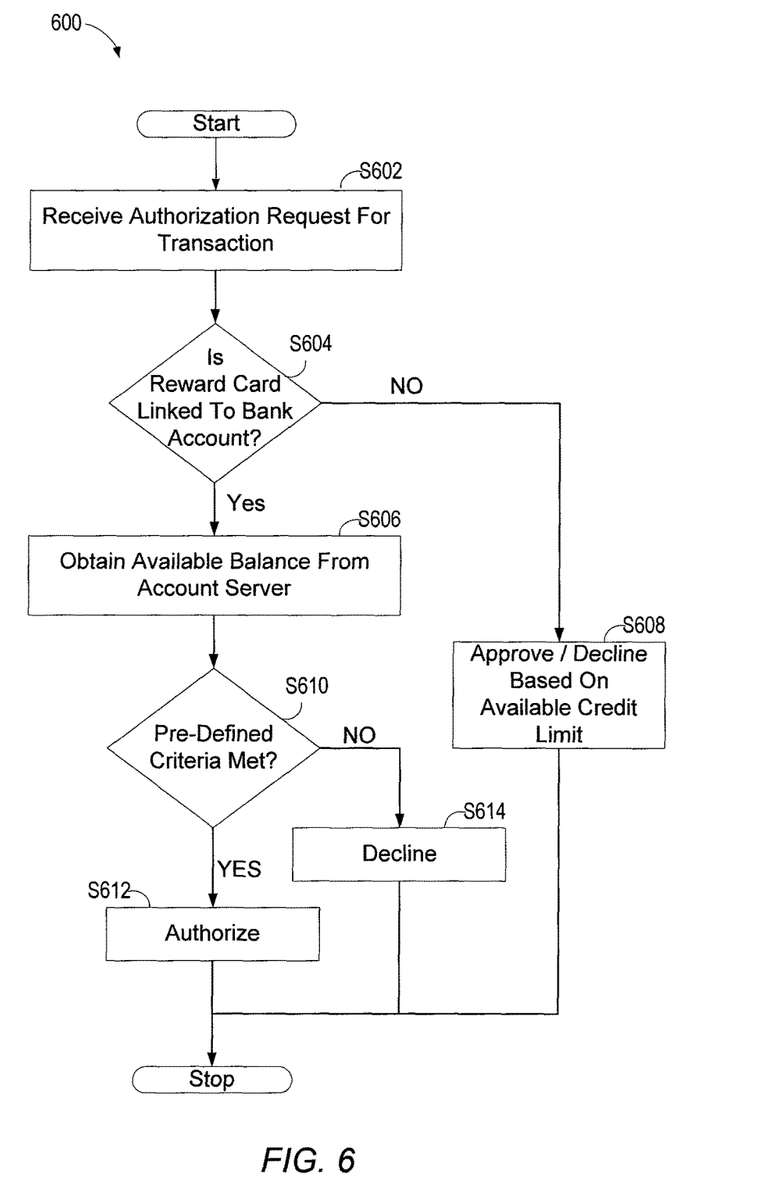
FIG. 6 is a flow chart illustrating an exemplary process for authorizing a transaction made by a reward card, according to an embodiment of the present invention.

FIG. 6 is a flow chart illustrating a process 600 for authorizing a transaction made by a reward card, according to an embodiment of the present invention. Process 600 may be executed, for example, in the environment shown in FIG. 1.

Process 600 proceeds at step S602, at which a reward server receives an authorization request for a transaction performed from a reward card. As discussed above, transaction amounts associated with the reward card may be posted on a periodic basis but debited after a pre-defined period of time. In various embodiments of the invention, the reward card is associated with a credit limit that defines a maximum amount of credit available for transactions through the reward card. However, in certain cases the reward card may be linked to a bank account of the customer.

At step S604, the reward server checks whether the reward card is linked to a bank account of the customer. If the reward card is linked to a bank account, then the process proceeds to step 606. However, if the reward card is not linked to any of the back account of the customer, then the process proceeds to step S608, at which the reward server authorizes or declines the transaction based on the available credit limit associated with the reward card.

At step 606 the reward server obtains from the account server the available balance in the bank account associated with the reward card. The account server may maintain a control account to keep a record of the available balance in the bank account of the customer. The control account is updated with the available line of credit associated with the bank account. The available balance may be calculated based, at least in part, on the transactions made through the bank account and the transactions made through the reward card of the customer. As discussed above, transactions associated with the bank account may be forwarded to the account server for authorization and, upon approval, can be debited in real-time from the line of credit available in the bank account of the customer. Thus, in an embodiment of the present invention, the account server may check with the control account for authorization of the transactions associated with the bank account. The account server also may update the control account in real-time about these transactions and the available line of credit associated with the bank account upon deduction of the amount of these transactions.

If it is determined in step S604 that the reward card is linked to the bank account, the reward server may be in communication with the control account maintained by the account server. The reward server may update the control account periodically about the transactions made by the reward card. The reward server also may post these transactions on the control account in pre-defined periodic intervals, which may be pre-defined by the customer and stored in a customer preferences store.

The control account may calculate the available balance in the bank account of the customer based on the transactions posted by the reward server on the control account. The control account may calculate the available balance by deducting the amount of posted transactions by the reward server from the line of credit available in the bank account of the customer. The customer may pre-define a period of time upon which the control account may calculate the available balance in the bank account.

Once the available balance is obtained, at step S610, the reward server checks whether the available balance and the transaction amount meet pre-defined criteria. Example criteria include whether the available balance in the bank account is at least equal to the amount of the transaction, whether a sufficient available balance will be left in the bank account after authorizing the transaction, and whether the amount of the transaction exceeds a pre-defined limit above the available balance in the bank account. If the criteria are met, then the process proceeds to step S612, where the reward server authorizes the transaction. If the criteria are not met, however, then at step S614 the reward server declines the transaction.

Figure 7:
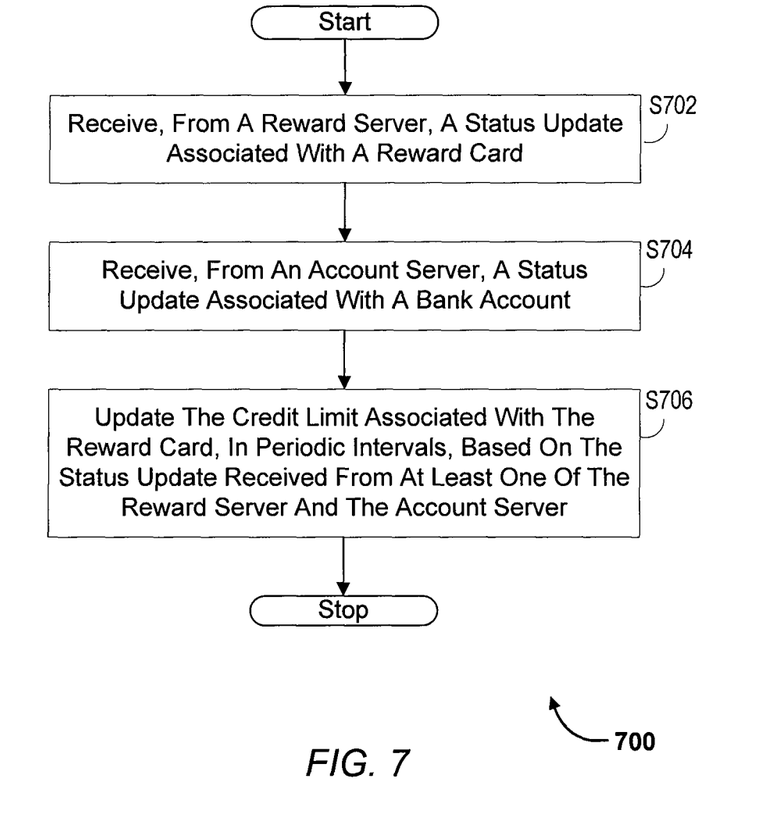
FIG. 7 is a flow chart illustrating an exemplary process for updating a credit limit associated with a reward card, according to an embodiment of the present invention.

FIG. 7 is a flow chart illustrating a process 700 for updating a credit limit associated with a reward card, according to an embodiment of the present invention. Process 700 may be executed, for example, in the environment shown in FIG. 1.

Process 700 proceeds at step S702, at which an updating module receives a status update associated with the reward card. For example, a reward server may periodically send a status update about various transactions made by the reward card to the updating module. The status update may include a spending history and an available credit limit associated with the reward card. The spending history may include amounts of transactions such as, for example, shopping done through the reward card and cash withdrawal from the available credit limit. A periodic basis for sending the status update may be pre-defined by the customer and stored in a customer preferences store.

At step S704, the updating module receives a status update associated with a bank account of the customer. For example, an account server may send a status update about various transactions made on the bank account. This status update may be made on the same periodic basis as status updates from a reward server or, alternatively, on another periodic basis as pre-defined by the customer. The status update associated with the bank account may include a spending history associated with the bank account and an available line of credit in the bank account. The spending history may include amounts of transactions such as, for example, shopping through a debit card associated with the bank account and cash withdrawal from ATMs.

The updating module may receive these status updates at steps S702 and S704 for a pre-defined period of time. For example, the updating module may receive a status update every month from both the account server and the reward server.

Subsequently, at step S706, the updating module updates the available credit limit based on the status updates received from both the account server and the reward server. The updating module may update the credit limit by deducting the amount of the transactions associated with the reward card that are not yet debited from the available line of credit in the bank account. In another embodiment, the customer may be allowed to set the initial credit limit on the reward card and then, based on the received status updates, the updating module may update the credit limit with an amount less than, equal to, or greater than the available line of credit available in the bank account.

IV. Example Implementations

Embodiments of the present invention, e.g., system 100, system 200, system 400, process 600, process 700, and the other embodiments described above, as well as any component described in connection with any embodiment, may be implemented using hardware, software or a combination thereof, and may be implemented in one or more computer systems or other processing systems. However, the manipulations performed by the present invention were often referred to in terms, such as comparing or checking, which are commonly associated with mental operations performed by a human operator. No such capability of a human operator is necessary, or desirable in most cases, in any of the operations described herein, which form a part of the present invention. Rather, the operations are machine operations. Useful machines for performing such operations may include general-purpose digital computers or similar devices.

Figure 8:
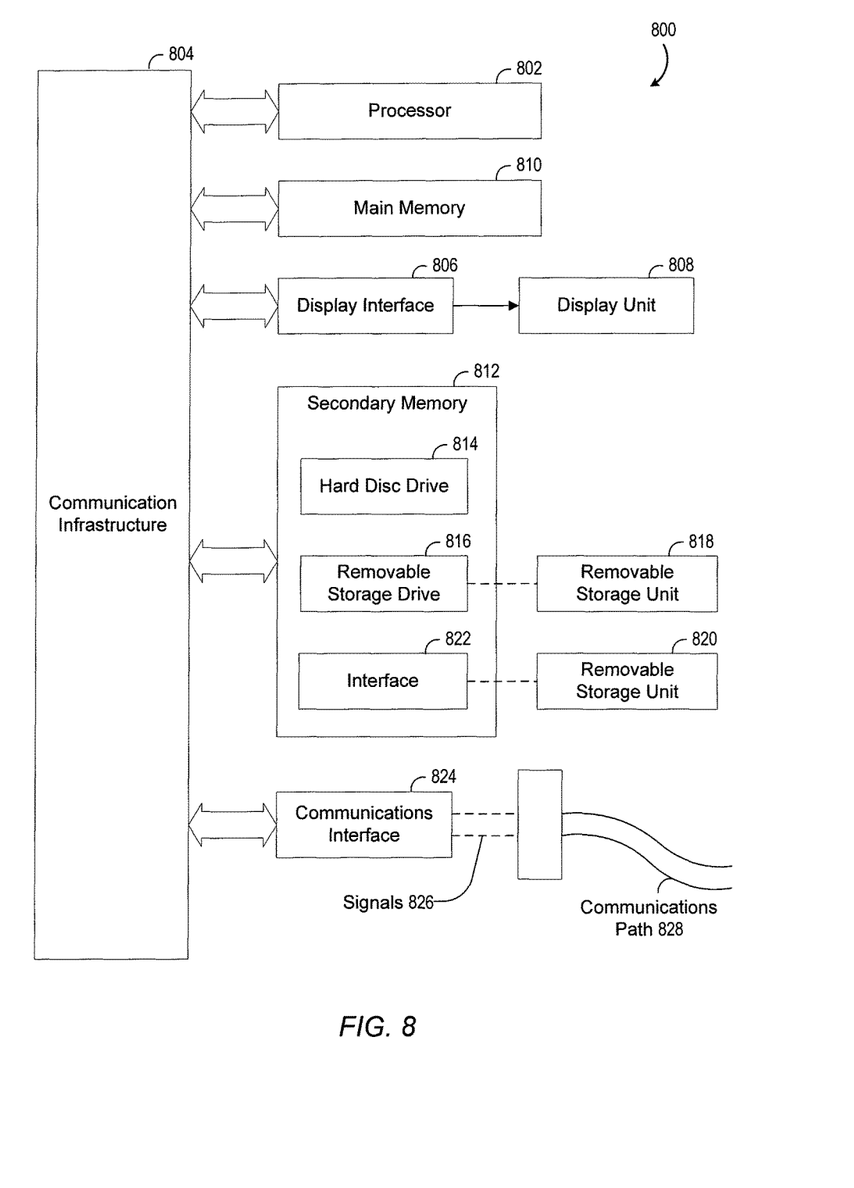
FIG. 8 is a block diagram of an exemplary computer system for implementing the present invention.

In fact, in accordance with an embodiment of the present invention, the present invention is directed towards one or more computer systems capable of carrying out the functionality described herein. An example of the computer systems includes a computer system 800, which is shown in FIG. 8. Various software embodiments are described in terms of this exemplary computer system 800. After reading this description, it will become apparent to those skilled in the art how to implement the present invention using other computer systems and/or architectures.

The computer system 800 includes at least one processor 802. Processor 802 is connected to a communication infrastructure 804, for example, a communications bus, a crossover bar, a network, and the like. Computer system 800 also includes display interface 806, which forwards graphics, text, and other data from the communication infrastructure 804 or from a frame buffer (not shown) for display on display unit 808.

The computer system 800 further includes main memory 810, such as random access memory (RAM), and secondary memory 812. Secondary memory 812 may further include, for example, hard disk drive 814 and/or removable storage drive 816, representing a floppy disk drive, a magnetic tape drive, an optical disk drive, etc. The removable storage drive 816 reads from and/or writes to a removable storage unit 818 in a well-known manner. Removable storage unit 818 may represent a floppy disk, magnetic tape or an optical disk, and may be read by and written on by the removable storage drive 816. As will be appreciated, the removable storage unit 818 includes a computer usable storage medium having stored therein, computer software and/or data.

Secondary memory 812 may include other similar devices for allowing computer programs or other instructions to be loaded into the computer system 800. Such devices may include, for example, removable storage unit 820, and interface 822. Examples of such devices may include a program cartridge and cartridge interface (such as that found in video game devices), a removable memory chip (such as an erasable programmable read only memory (EPROM), or programmable read only memory (PROM)) and its associated socket, and other removable storage units 820 and interfaces 822, which allow software and data to be transferred from the removable storage unit 820 to the computer system 800.

Computer system 800 may further include a communication interface 824. The communication interface 824 allows software and data to be transferred between the computer system 800 and external devices. Examples of the communication interface 824 include, but may not be limited to, a modem, a network interface (such as an Ethernet card), a communications port, a Personal Computer Memory Card International Association (PCMCIA) slot and card, and the like. Software and data transferred via the communication interface 824 are in the form of a plurality of signals, hereinafter referred to as signals 826, which may be electronic, electromagnetic, optical or other signals capable of being received by the communication interface 824. The signals 826 are provided to the communication interface 824 via a communication path (e.g., channel) 828. The communication path 828 carries the signals 826 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 816, a hard disk installed in hard disk drive 814, and the like. These computer program products provide software to the computer system 800. The present invention is directed to such computer program products.

Computer programs (also referred to as computer control logic) are stored in the main memory 810 and/or the secondary memory 812. Computer programs may also be received via the communication interface 804. Such computer programs, when executed, enable the computer system 800 to perform the features of the present invention, as discussed herein. In particular, the computer programs, when executed, enable the processor 802 to perform the features of the present invention. Accordingly, such computer programs represent controllers of the computer system 800.

Where the present invention is implemented using software, the software may be stored in a computer program product and loaded into the computer system 800 using the removable storage drive 816, the hard disk drive 814 or the communication interface 824. The control logic (software), when executed by the processor 802, causes the processor 802 to perform the functions of the present invention as described herein.

In another embodiment, the present invention is implemented primarily in hardware using, for example, hardware components such as application specific integrated circuits (ASIC). Implementation of the hardware state machine so as to perform the functions described herein will be apparent to those skilled in the art.

In yet another embodiment, the present invention is implemented using a combination of both the hardware and the software.

V. Conclusion

Various embodiments of the present invention have been described above. It should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described example embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
   receiving, by an account server over the Internet via a payment gateway having an application service provider, an authorization request for a transaction performed using a reward account,
   wherein the authorization request is encrypted, and
   wherein the reward account is at least one of a charge account or a credit account;
   determining, by the account server communicating with a reward server, that the reward account is associated with a debit account,
   wherein the account server and the reward server are linked through a communication network;
   obtaining, by the account server communicating with the reward server, an available funds balance in the debit account;
   determining, by the account server, the available balance by deducting a debit amount incurred by the debit account from the available funds balance;
   updating, by the account server using an updating module and at an end of a billing cycle associated with the reward account, the available balance by deducting an amount of the transaction incurred by using the reward account from a line of credit available in the debit account;
   comparing, by the account server and in real-time, an amount of the transaction to the available balance in the debit account linked to the reward account prior to transmitting an authorization message for the transaction, wherein the debit account is at least one of a customer checking account or a customer savings account;
   determining, by the account server, in real-time and based on the comparing, at least one of that the available balance is a pre-defined amount greater than the amount of the transaction, the amount of the transaction is within a pre-defined limit above the available balance or that the available balance is greater than or equal to the amount of the transaction;
   authorizing, by the account server, the transaction based on the outcome of the determination; and
   transmitting, by the account server, the authorization for the transaction in response to the outcome of the determination.

2. The method according to claim 1, further comprising debiting, by the account server and from the debit account, the amount of the transaction incurred by the reward account.

3. The method according to claim 2, wherein a reward server transmits the authorization request to the account server, and wherein the reward server receives the authorization for the transaction from the account server.

4. The method according to claim 3, wherein the account server posts the transaction to the debit account within a pre-defined periodic interval.

5. The method according to claim 4, wherein the reward server is further configured to provide reward points on the transaction, and
   wherein account server is further configured to provide an update of the available balance to a customer through at least one of an automated teller machine, online banking, and customer service.

6. The method according to claim 1, further comprising adjusting the credit limit associated with the rewards account based on the available balance.

7. The method according to claim 1, wherein the line of credit associated with the debit account is based on at least one of a current actual balance in the debit account, an overdraft amount, a savings contribution amount, or an amount of reward points.

8. The method of claim 1, further comprising:
   receiving, by an updating module, an amount of the transaction associated with the reward account;
   receiving, by the updating module, an amount of the debit account transaction; and
   updating, by the updating module, a credit limit on the reward account based on at least one of the amount of the transaction associated with the reward account or the amount of the debit account transaction.

9. The method according to claim 8, wherein an account server receives an authorization request for the transaction associated with the debit account, and wherein the account server authorizes the debit account transaction, and wherein the account server transmits the amount of the authorized debit account transaction to the updating module.

10. The method according to claim 9, wherein a reward server receives an authorization request for the transaction performed using the reward account, and wherein the reward server authorizes the reward account transaction, and wherein by the reward server transmits the amount of the authorized reward account transaction to the updating module, and wherein the reward server receives the updated credit limit from the updating module.

11. The method according to claim 9, wherein the updating module is further configured to receive an available balance in the debit account from the account server,
    wherein the credit limit is further based on the available balance.

12. The method according to claim 11, wherein the credit limit is updated on a periodic interval.

13. The method according to claim 12, wherein the line of credit associated with the debit account is based on at least one of a current actual balance in the bank account, an overdraft amount, a savings contribution amount, or an amount of reward points.

14. An article of manufacture including a computer readable medium having instructions stored thereon that, in response to execution by an updating module, cause the updating module to perform operations comprising:
receiving, by the updating module over the Internet via a payment gateway having an application service provider, an authorization request for a transaction performed using a reward account,
wherein the authorization request is encrypted, and
wherein the reward account is at least one of a charge account or a credit account;
determining, by the updating module communicating with a reward server, that the reward account is associated with a debit account,
wherein the updating module and the reward server are linked through a communication network;
obtaining, by the updating module communicating with the reward server, an available funds balance in the debit account;
determining, by the updating module, the available balance by deducting a debit amount incurred by the debit account from the available funds balance;
updating, by the updating module and at an end of a billing cycle associated with the reward account, the available balance by deducting an amount of the transaction incurred by using the reward account from a line of credit available in the debit account;
comparing, by the updating module and in real-time, an amount of the transaction to the available balance in the debit account linked to the reward account prior to transmitting an authorization message for the transaction, wherein the debit account is at least one of a customer checking account or a customer savings account;
determining, by the updating module, in real-time and based on the comparing, at least one of that the available balance is a pre-defined amount greater than the amount of the transaction, the amount of the transaction is within a pre-defined limit above the available balance or that the available balance is greater than or equal to the amount of the transaction;
authorizing, by the updating module, the transaction based on the outcome of the determination; and
transmitting, by the updating module, the authorization for the transaction in response to the outcome of the determination.

15. An account server comprising:
a processor, and
a tangible, non-transitory memory configured to communicate with the processor,
the tangible, non-transitory memory having instructions stored thereon that, in response to execution by the processor, cause the processor to perform operations comprising:
receiving, by the account server over the Internet via a payment gateway having an application service provider, an authorization request for a transaction performed using a reward account,
wherein the authorization request is encrypted, and
wherein the reward account is at least one of a charge account or a credit account;
determining, by the account server communicating with a reward server, that the reward account is associated with a debit account,
wherein the account server and the reward server are linked through a communication network;
obtaining, by the account server communicating with the reward server, an available funds balance in the debit account;
determining, by the account server, the available balance by deducting a debit amount incurred by the debit account from the available funds balance;
updating, by the account server using an updating module and at an end of a billing cycle associated with the reward account, the available balance by deducting an amount of the transaction incurred by using the reward account from a line of credit available in the debit account;
comparing, by the account server and in real-time, an amount of the transaction to the available balance in the debit account linked to the reward account prior to transmitting an authorization message for the transaction, wherein the debit account is at least one of a customer checking account or a customer savings account;
determining, by the account server, in real-time and based on the comparing, at least one of that the available balance is a pre-defined amount greater than the amount of the transaction, the amount of the transaction is within a pre-defined limit above the available balance or that the available balance is greater than or equal to the amount of the transaction;
authorizing, by the account server, the transaction based on the outcome of the determination; and
transmitting, by the account server, the authorization for the transaction in response to the outcome of the determination.

* * * * *